Aug. 25, 1936.   C. A. FOURNESS ET AL   2,052,529
APPARATUS FOR MAKING CUSHION EDGED SANITARY NAPKINS
Filed Feb. 17, 1934   5 Sheets-Sheet 3
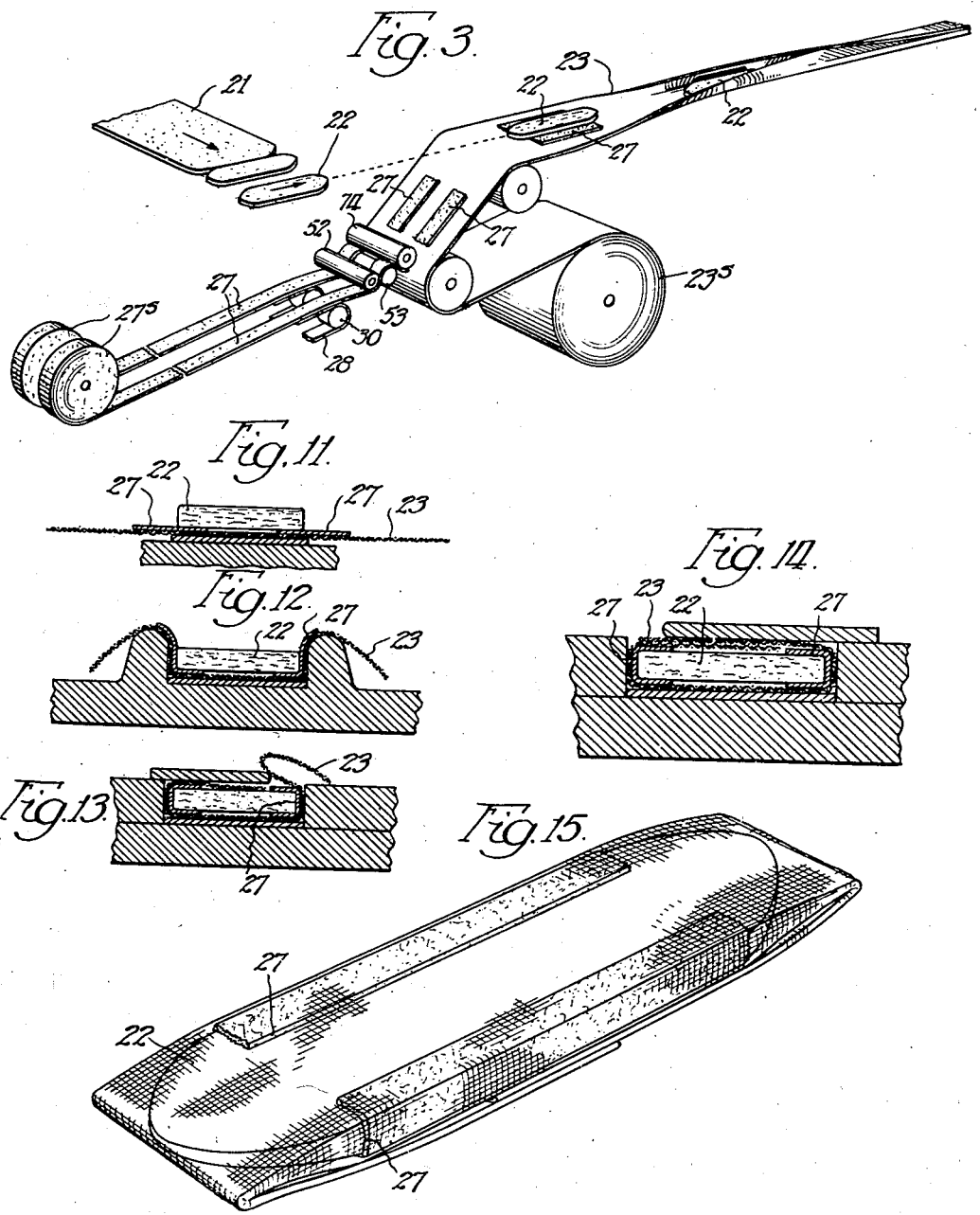
Inventors:
Charles A. Fourness
Charles J. Greiner
By: Fisher, Clapp, Frans & Paul Attys.

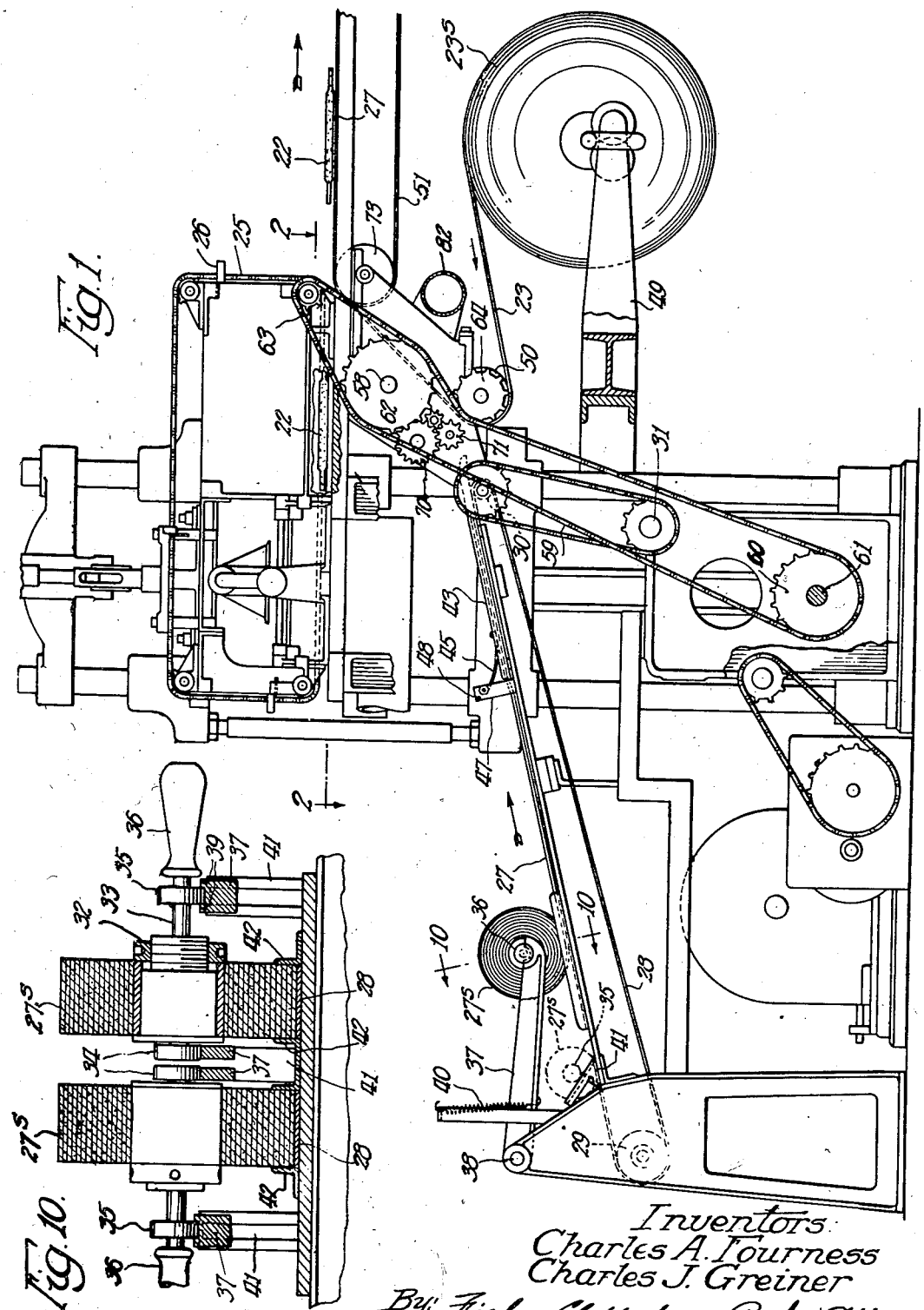

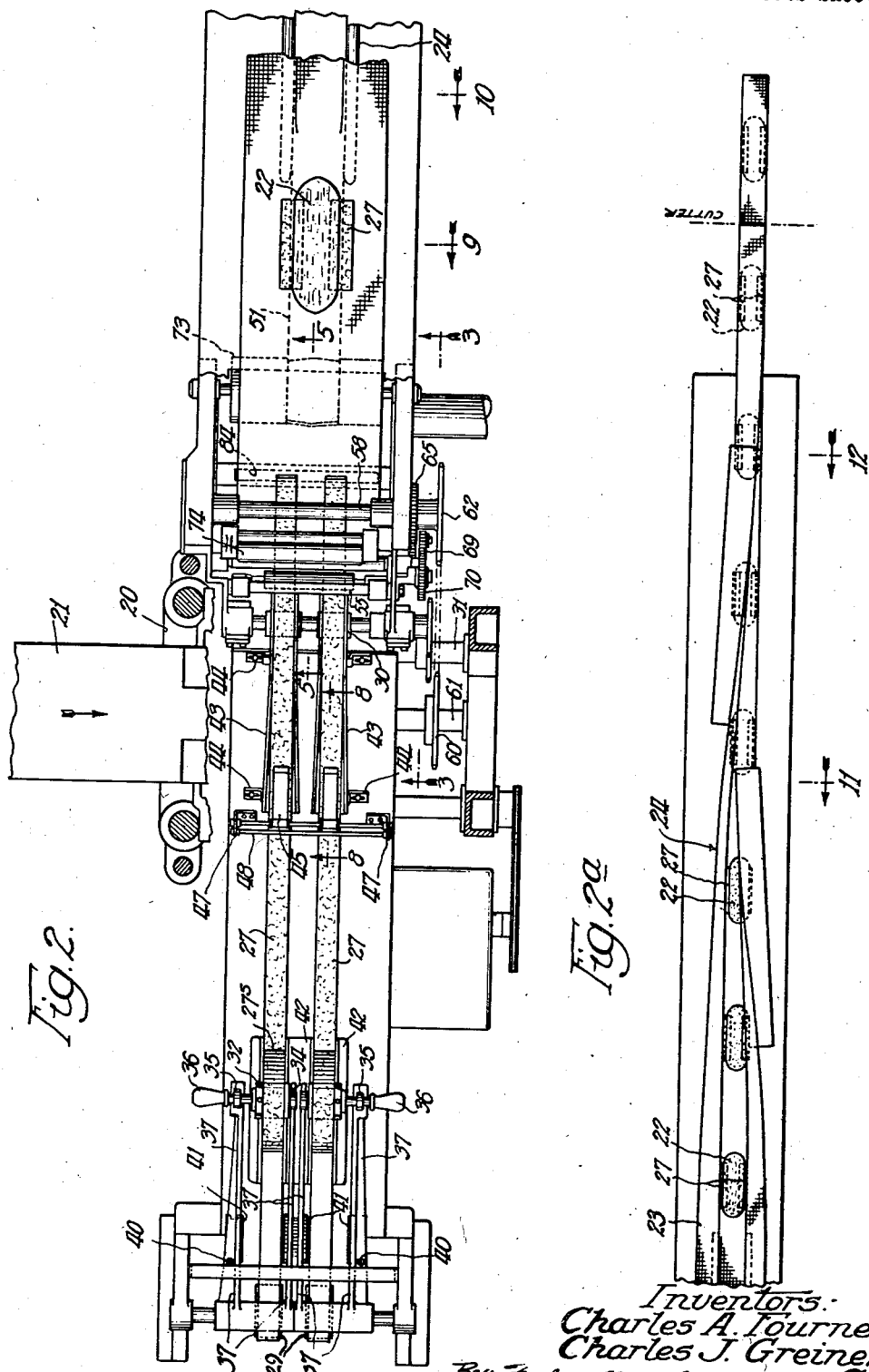

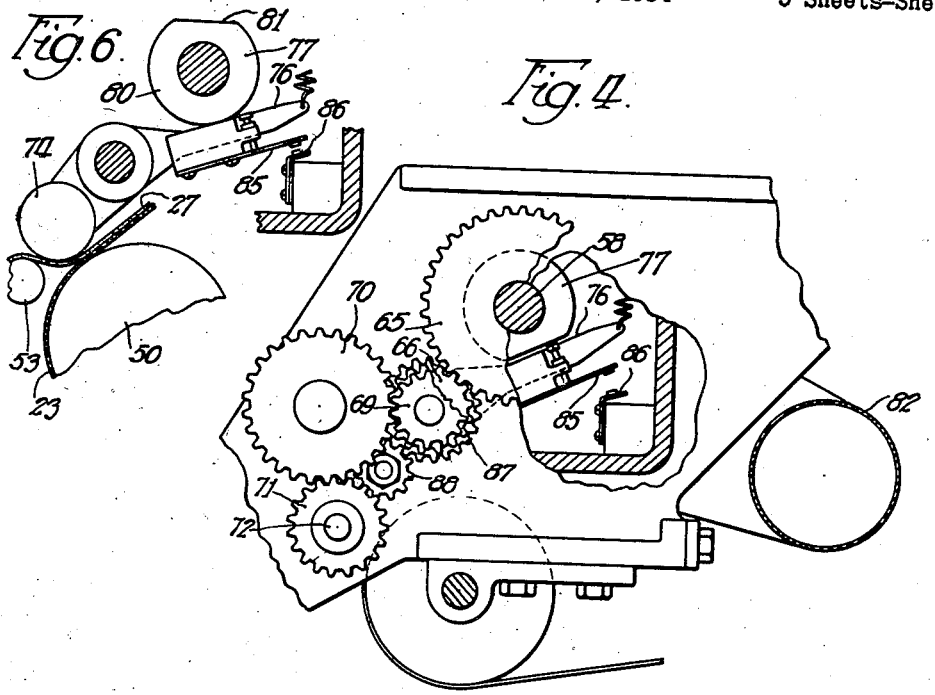

Aug. 25, 1936.   C. A. FOURNESS ET AL   2,052,529
APPARATUS FOR MAKING CUSHION EDGED SANITARY NAPKINS
Filed Feb. 17, 1934   5 Sheets-Sheet 5

Inventors.
Charles A. Fourness
Charles J. Greiner
By: Fisher, Clapp, Soans & Pond Attys Patented Aug. 25, 1936

2,052,529

UNITED STATES PATENT OFFICE 2,052,529

APPARATUS FOR MAKING CUSHION-EDGED SANITARY NAPKINS

Charles A. Fourness, Appleton, and Charles J. Greiner, Menasha, Wis., assignors to International Cellucotton Products Company, Chicago, Ill., a corporation of Delaware Application February 17, 1934, Serial No. 711,752

9 Claims. (Cl. 154—29)

This invention relates to improvements in machines for making sanitary napkins having cushioned edges, and the main objects of the invention are to provide mechanism for assembling the component parts of the sanitary napkins; to provide means which will effect said assembling rapidly, efficiently and in an entirely sanitary manner; to provide mechanism which will be operative to produce napkins embodying the said construction from supply rolls of the component parts of the napkin; to provide means for preventing the accidental production of napkins without one of the component parts thereof; and in general, it is the object of this invention to provide an improved apparatus for the purpose set forth.

Other objects and advantages of the invention will be understood by reference to the following specification and accompanying drawings (5 sheets) wherein there is illustrated the method and apparatus for producing sanitary napkins embodying the said construction.

In the drawings—

Fig. 1 is a side elevation;

Fig. 2 is a plan;

Fig. 2a is a more or less diagrammatic plan illustrating certain folding mechanism which constitutes a continuation of the mechanism shown in Fig. 2;

Fig. 3 is a more or less diagrammatic representation of the method and apparatus herein disclosed;

Fig. 4 is a fragmentary side elevation corresponding to a portion of Fig. 1 but showing the parts on an enlarged scale.

Fig. 5 is a section substantially on the line 5—5 of Fig. 2;

Fig. 6 is a section corresponding to a portion of Fig. 4 but showing certain parts in a changed position;

Fig. 10 is a section on the line 10—10 of Fig. 1;

Figs. 11, 12, 13 and 14 illustrate successive steps in the folding of certain component parts of the napkin about another part; and Fig. 15 is a perspective illustrating a sanitary napkin embodying the construction produced by the mechanism herein described.

Figure 7:
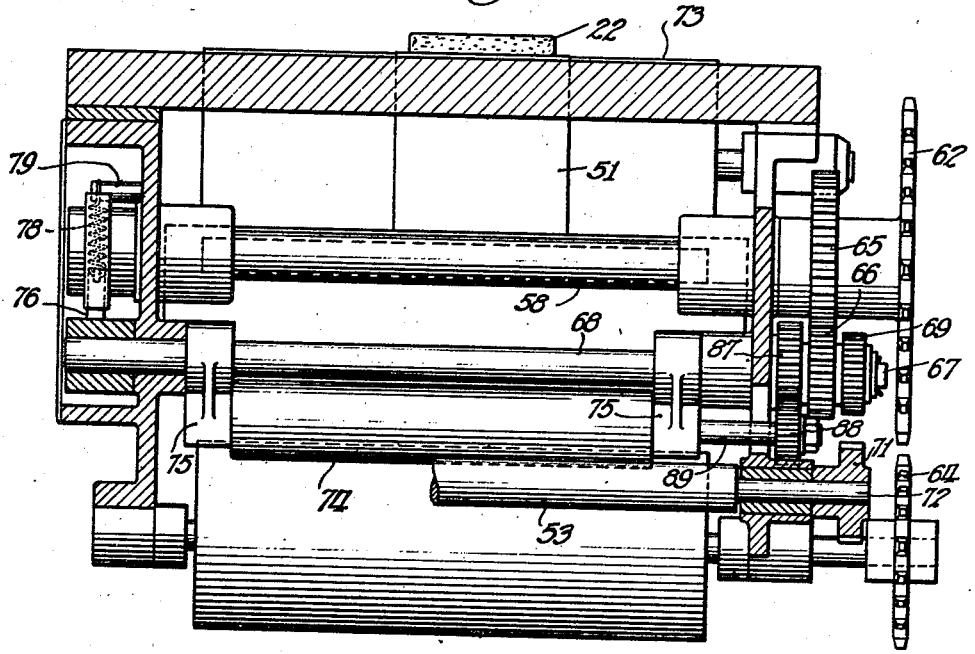
Fig. 7 is a section on the line 7—7 of Fig. 5.
Figure 8:
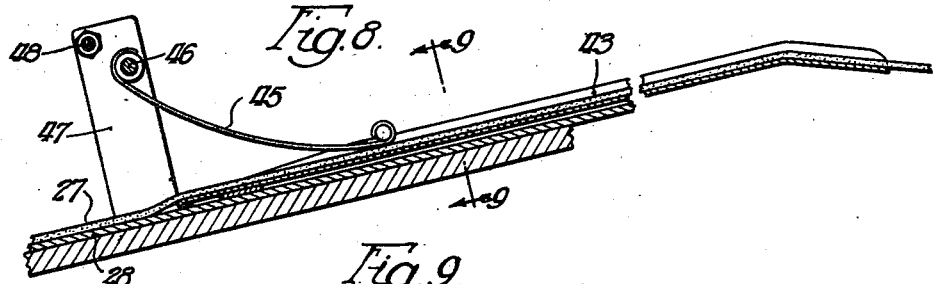
Fig. 8 is a section on the line 8—8 of Fig. 2.
Figure 9:
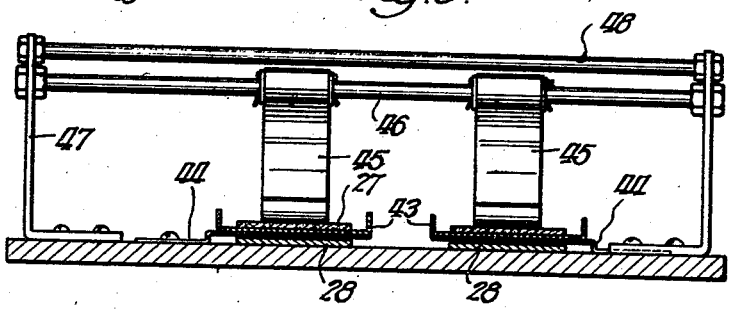
Fig. 9 is a section on the line 9—9 of Fig. 8.

Referring now to the drawings, there is illustrated a sanitary napkin forming mechanism which includes mechanism designated 20 which serves to cut from the forward end of a strip 21 of absorbent wadding, individual pads such as designated 22. The pads 22 are subsequently fed to a strip of gauze designated 23 which is folded around the pad by folding mechanism designated 24. One form of the mechanism thus referred to is shown and described in detail in the patent to Bauer, No. 1,794,358, issued March 3, 1931. In the present instance, the arrangement for feeding the pads from the mechanism which cuts them from the wadding strip 21 to the gauze strip is modified somewhat from that shown in the Bauer patent, but inasmuch as the details thereof do not constitute a part of the present invention, description thereof appears unnecessary in this application. However, it may be said that in this instance, the modified pad feeding mechanism includes an endless chain 25 having a series of pushers 26 which engage and propel the pads to the gauze strip 23. The chain 25 is of course driven by suitable connections to a source of power.

The invention herein disclosed has reference more particularly to an arrangement for applying cushion strips such as designated 27, 27 to the opposite edges of the pad element 22. The cushion strips 27 are preferably formed of soft, loosely felted cotton and the effect of the strips is to eliminate the tendency of more conventional forms of napkins to chafe the wearer. (See Figs. 14 and 15). Sanitary napkins embodying this idea are shown in the patent to Vola M. Jurgensen, No. 1,946,626, issued February 13, 1934.

The method of incorporating such cushion strips embodies the steps of feeding the gauze strip 23, depositing the cushion strips 27, 27 in predetermined spaced relation on the gauze strip, then depositing the pad 22 on the gauze strip with its opposite marginal portions overlying the marginal cushions of the respective cushion strips, and then folding the side portions of the wrapper 23 around the pad and incidentally also folding the cushion strips around the opposite edge portions of the pad, substantially as indicated in Figs. 11 to 14 inclusive.

For depositing the cushion strips on the gauze strip, the following mechanism is provided:

A pair of conveyors 28 extend around pulleys 29 and 30, which are journaled in suitable frame elements substantially as shown in the drawings (Fig. 1), and these conveyors are driven at a suitable speed by means of chain and sprocket connections, to a power shaft 31.

The cushion strips 27 are supplied in separate rolls designated 27s, 27s, these rolls being independent of one another and independently supported in engagement with the respective conveyors 28. Each roll 27ˢ is provided with a core 32 which carries a spindle 33 supplied with ball bearing members 34 and 35 on opposite sides of the roll. The outer end of each spindle 33 is also provided with a handle 36 for facilitating manipulation, as will hereinafter be explained. The rolls 27ˢ are disposed in engagement with the respective conveyors 28 and they are held against bodily movement with the conveyors by means of pairs of pivoted arms designated 37. Each pair of arms 37 is pivoted at one end as indicated at 38, in a suitable supporting frame, and at its free end it is provided with a semi-circular recess for receiving the respective bearings 34 and 35. The outermost arm of each pair 37 is provided with flanges designated 39 engaging opposite sides of the bearing 35 for preventing endwise displacement by the cushion strip roll. Springs such as designated 40 and associated with the respective arm pairs, serve to yieldingly hold the arm pairs in engagement with the bearings of the cushion strip rolls. However, the springs 40 are only of such strength that the weight of the cushion strip rolls and their cores is sufficient to continually urge the arms to swing downwardly against the tension of the springs so that the cushion strip rolls will always rest mainly on the respective conveyor belts 28. Hence the forward movement of the conveyor belt will cause the cushion strip roll resting thereon to unwind so that the cushion strip is fed forwardly with the belt.

For convenience in mounting a new roll of cushion material when another roll is nearly exhausted, there are provided brackets designated 41 which are arranged to receive the bearings of the respective rolls, while permitting the cushion material to directly engage the belts. The mounting of a new roll is accomplished by first depressing the arm pair 27 so as to disengage the nearly exhausted roll from the arms, then permitting the nearly exhausted roll to roll rearwardly until it is supported by the brackets 41. The new supply roll is then placed in the arms 37, which are temporarily manually supported, until the old roll is in fact exhausted, whereupon the new roll is lowered into engagement with the belt so that the leading end of the new strip will immediately follow the rear end of the preceding strip. The narrow strips of cushion material are initially guided adjacent the respective supply rolls by side guides 42, 42 and near the delivery end of the respective conveyors, the strips are directed over guide chutes such as indicated at 43. The guide chutes 43 are formed of sheet metal and their receiving end is somewhat wider than the cushion strip so as to facilitate the entrance of the strip to the guide. As shown best in Fig. 2, the chutes 43 are gradually reduced in width from the wide mouth end to substantially the same width at their delivery ends as the width of the cushion strips. The chutes are each laterally adjustably mounted by means of suitable brackets such as indicated at 44 so that the chutes may be adjusted to accurately position the strips in predetermined spaced relation to each other and in predetermined positions on the gauze strip to which they are delivered.

Over each chute 43 there is pivotally supported an electric contact arm designated 45, each such arm being pivoted on a rod 46 which is carried by means of a pair of upstanding brackets 47. The brackets are rigidly maintained in spaced relation near their upper ends by a spacer rod 48.

The machine is operated from any suitable source of power which may be connected to the apparatus through the agency of a suitable form of disengageable clutch mechanism, or the apparatus may be operated by being directly connected to a suitable electric motor. The swinging arm arrangement 45 is provided for stopping the operation of the machine in the event that the supply of cushion strip is exhausted and not promptly replaced, or in the event that for some other reason, the cushion strip does not continue to pass over the guide chute 43. The arm 45 and the guide chute 43 are connected in an electric circuit which controls a disengageable clutch mechanism, or a motor circuit controller, or other suitable means for stopping the machine. It will be seen that in the event that the arm 45 comes into electrical contact with the chute 43, a circuit will be completed and the stopping mechanism operated. The details of such stopping mechanism are not involved in this application and hence need not be further described. Various forms of such mechanism may be produced by any mechanic skilled in the art.

In the present instance, the supply roll of gauze designated 23ˢ is suitably supported on arms 49 which extend from the main framework of the mechanism and the gauze strip 23 is guided around a guide roller 50 from whence it extends upwardly at an angle and to the receiving end of a conveyor belt 51. The belt 51 is preferably continuously driven at a speed considerably in excess of the speed at which the conveyor belts 28 and cushion strips are fed. In the production of the napkins, the pads 22 are fed to the gauze strip in predetermined longitudinally spaced relation, as indicated in Fig. 2a, and the cushion strips are supplied to the gauze in short lengths dependent upon the length of the pads and in such position on the gauze strip that the pads will be deposited in register with pairs of the cushion strips.

For separating the cushion supply strip 27ˢ into lengths corresponding to the length of the pads which they are to cover, the mechanism best shown in Figs. 4 and 5 is provided.

The strips 27ˢ are directed by the delivery end of the chutes 43 to a pair of feed rolls 52 and 53 respectively. The roll 53 is journaled on a fixed axis in suitable side frame parts and the roll 52 is journaled in the free ends of arms 54 which are carried by a shaft 55, which in turn is pivoted at its ends in the side frames of the mechanism. A spring 56, connected between one of the arms 54 and a pin 57 projecting from the adjacent side frame surface, serves to yieldingly urge the roller 52 toward the roller 53 so as to grip the cushion strips therebetween to continue the feed movement thereof. The roll 53 is driven at the same surface speed as the speed of the conveyor 28 and the roll 52, pressing against the roll 53, is rotated by reason of the frictional contact between itself and the cotton strips and the driven roll 53.

The drive of the roll 53 may conveniently be taken from a shaft 58 which is journaled in the side frames of the mechanism and which is driven by means of a chain 59. The chain 59 engages a sprocket 60 driven by the main power shaft 61 of the mechanism and the said chain engages a sprocket 62 carried by said shaft 58. The chain 59 also engages a sprocket 63 which serves to actuate the feed chain 25 and the sprocket 64 carried by the shaft of the gauze guide roll 50. The pitch diameter of the sprocket 64 is such that the roll 50 is driven at the same surface speed as the conveyor 51.

The shaft 58 has secured to it at one end a gear 65 which meshes with a gear 66 rotatably mounted on an extension 67 of the shaft 68. The gear 66 is rigidly connected to another gear 69 which meshes with an idler gear 70 which in turn meshes with a gear 71 secured to the shaft 72 of the roll 53. The gear ratios are of course such that the roll 53 is driven at the said surface speed.

From the roll 53, the cotton strips are delivered to the gauze strip between the guide roll 50 and the roll 73 at the receiving end of the conveyor 51. A breaker roll 74 is rotatably carried by the free ends of a pair of arms 75, which arms are mounted on the shaft 68, which is in turn journaled in the opposite side frames, as clearly shown in Fig. 7. On one side of the machine, the shaft 68 projects beyond the side frame and is provided with an arm 76 which is designed to be engaged by a rotary cam 77 carried by the shaft 58. The speed of rotation of the shaft 58 is such that it makes one complete revolution for each pad deposited on the gauze strip. The arm 76 is thus actuated by the cam 77 in synchronism with the deposition of pads on the gauze. A spring 78 connected between the free end of the arm 76 and an anchor pin 79 projecting from the side frames serves to normally cause the arm 76 to follow the cam 77.

The cam 77 is a simple cam consisting of a cylindrical portion 80 and a cut-off or flat portion 81. When the arm 76 is engaged by the cylindrical portion 80 of the cam, the breaker roll 74 is held in such spaced relation to the gauze guide roll 50 that there is no pressure applied by the breaker roll 74 on the cushion strips or gauze between the breaker roll and guide roll 50. However, when the arm 76 is permitted to swing upwardly by the flat cam surface 81, the breaker roll 74 presses the cushion strips tightly against the gauze and the guide roll 50, with the result that that portion of the cushion strip which has already passed under the breaker roll is caused to travel at the same speed as the gauze strip. The breaker roll is driven at the same surface speed as the speed of travel of the gauze, by means of a gear connection with the gear 65. The said gear connection includes a gear 87 which is integrally or rigidly connected with the gear 66 and a gear 88 which is mounted on the shaft 89 of the breaker roll. Since the gauze strip is traveling considerably faster than the cushion supply strip, it will be seen that the forward end portion of the cushion supply strip will be torn from the strip so as to form a short independent cushion strip section. It has been found that the point of breakage or separation occurs immediately under the breaker roll 74, as indicated in Fig. 5, and the then leading end of the cushion supply strip is in effect guided by the breaker roll into engagement with the gauze strip. The breaker roll 74 is permitted to remain in pressing relationship to the gauze roll 50 only a short time, just sufficient to accomplish its purpose, so that by the time the new leading end of the cushion supply strip is located between the breaker roll and the gauze supply roll, the breaker roll clears the gauze roll sufficiently to permit the new leading end of the cushion supply strip to pass freely under the breaker roll.

To more effectively cause the new leading end of the cushion supply strip to follow the gauze strip instead of the breaker roll, a suction device is provided. In this instance, it includes a forked suction box designated 82 which has branches 83 and 84. The branch 83 overlies the gauze guide roll 50 and approaches as closely as is practicable, the breaker roll 74 on the under side of the gauze strip between the guide roll 50 and the conveyor roll 73. It will be seen that suction applied through the branch 83 will tend to draw the new leading end of the cushion supply strip to the gauze and cause it to lie flat thereon instead of winding up on the breaker roll.

The branch 84 of the suction box, together with the branch 83, also has the function of causing the separated cushion strip to cling to the gauze and to pick up its travel immediately upon separation of the cushion strip element from the supply strip. Proper positioning of the cushion strip is also insured by this suction box arrangement. The suction box is of course connected to any suitable exhaust pump. To further guard against the rolling up of the cushion supply strip on the breaker roll 74, the following arrangement is provided: The arm 76 of the breaker roll mechanism is provided with an electrical contact element 85 which is designed to engage another contact element 86 mounted in operative relation to the member 85. The contact elements 85 and 86 are connected in an electric circuit which controls the operation of the machine substantially as explained in connection with the contact element 45, so that in the event that a circuit is completed by engagement with the elements 85 and 86, the mechanism would be stopped. Under normal conditions, when the breaker roll is held in spaced relation to the gauze guide roll 50, the contact elements approach each other but do not contact, substantially as indicated in Fig. 6. In the event that the cushion strip should wind itself upon the breaker roll, the thickness of the cushion strip so wound on the roll would quickly engage the guide roll 50 and cause the breaker roll to move further away from the gauze guide roll. Such outward swinging movement of the breaker roll would, of course, be communicated to the cam arm 76, with the result that the contact 85 would engage the contact 86 and thus effect stoppage of the mechanism.

The speed of travel of the cushion supply strip 27⁶, the timing of the operation of the breaker roll 74 and the operation of the pad feeding and depositing mechanism are so synchronized that pairs of transversely spaced cushion strips will be deposited in longitudinally spaced relation on the gauze strip and the pads fed forward and deposited in the desired position with reference to the pairs of cushion strips. This arrangement is more clearly illustrated in the schematic view, Fig. 3.

The mechanism thus described serves to produce a continuous series of sanitary napkins, that is, the spaced pads are contained in a continuous strip of gauze which is gradually folded around the pads as they travel with the gauze strip. As the pad parts travel through the folding devices shown best in Figs. 12, 13 and 14, and also represented in Fig. 2a, the cushion strips 27 are, of course, folded around the longitudinal marginal portions of the pad. For separating the continuous pad series into individual pads, a suitable cutter is provided, for example, as shown in said Bauer patent. The location of the cutter is indicated in Fig. 2a.

Pads embodying the described construction are advantageous, in that the cushion strips 27 serve to effectively cover the more or less raw side edges of the pad 22 and present a soft, smooth covering which has no tendency to irritate or chafe. The cushion strips also seem to prevent any chafing or irritating tendency of the gauze material itself, possibly because the gauze strip is more or less anchored to the pad against creeping and bunching. However, inasmuch as this application is not directed to the pad itself, further reference to the benefits of the pad structure is deemed unnecessary.

It will be understood that the above described apparatus may be changed without departing from the spirit of the invention, the scope of which should be determined by reference to the following claims, the same being construed as broadly as possible consistent with the state of the art.

We claim:

1. In a machine for making sanitary napkins, the combination of means for propelling a gauze strip, means for propelling a cushion strip of such thinness as to be foldable with the gauze strip as an incident to folding of the latter, said cushion strip being propelled at a slower speed than said gauze strip, means for separating and depositing forward end portions of the cushion strip successively on said gauze strip in predetermined spaced relation, and pneumatic means for causing said separated cushion strip portion to cling to said gauze strip.

2. In a machine for making sanitary napkins, the combination of means for propelling a strip of gauze, means for propelling at a slower speed a cushion strip, comprising a pair of driven rolls between which said cushion strip passes, a guide member over which said gauze strip passes, a breaker roll associated with said guide member and movable toward and from the guide member, said cushion strip being fed between said breaker roll and said guide member, means for moving said breaker roll toward said guide member so as to cause the cushion strip to engage and travel with said gauze strip, means for rotating said breaker roll at the same surface speed as the speed of travel of said gauze, said breaker roll being thereby operative to tear forward portions of said cushion strip from the advancing cushion strip, means for moving said breaker roll away from said guide means so as to release said cushion strip, and means for causing said separated cushion strip to adhere to the gauze strip.

3. In a machine for making sanitary napkins, the combination of means for feeding a gauze strip, a guide roll for guiding said gauze strip through a predetermined path of travel, means for feeding and delivering, at a slower speed, a strip of cushion material to said gauze strip, a rock arm pivotally mounted intermediate its ends, a breaker roll carried by said rock arm at one end, cam means operatively associated with the other end of said rock arm and operative to effect movement of said breaker roll into and out of operative relation to said guide roll, means for rotating said breaker roll at the same surface speed as the speed of travel of said gauze strip, said breaker roll being operative to engage said cushion strip over said guide roll and to tear a forward portion of said cushion strip from the strip to form an independent cushion strip length, and means for causing said cushion strip length to travel with said gauze strip.

4. In a machine for making sanitary napkins, the combination of means for feeding a gauze strip, a guide roll for guiding said gauze strip through a predetermined path of travel, means for feeding and delivering, at a slower speed, a strip of cushion material to said gauze strip, a rock arm pivotally mounted intermediate its ends, a breaker roll carried by said rock arm at one end, cam means operatively associated with the other end of said rock arm and operative to effect movement of said breaker roll into and out of operative relation to said guide roll, means for rotating said breaker roll at the same surface speed as the speed of travel of said gauze strip, said breaker roll being operative to engage said cushion strip over said guide roll and to tear a forward portion of said cushion strip from the strip to form an independent cushion strip length, means for causing said cushion strip length to travel with said gauze strip, and means for causing the forward end portion of the cushion supply strip to follow the gauze strip.

5. In a machine for making sanitary napkins, the combination of means for feeding a gauze strip, a guide roll for guiding said gauze strip through a predetermined path of travel, means for feeding and delivering, at a slower speed, a strip of cushion material to said gauze strip, a rock arm pivotally mounted intermediate its ends, a breaker roll carried by said rock arm at one end, cam means operatively associated with the other end of said rock arm and operative to effect movement of said breaker roll into and out of operative relation to said guide roll, means for rotating said breaker roll at the same rate of speed as the speed of travel of said gauze strip, said breaker roll being operative to engage said cushion strip over said guide roll and to tear a forward portion of said cushion strip from the strip to form an independent cushion strip length, means for causing said cushion strip length to travel with said gauze strip, means for causing the forward end portion of the cushion supply strip to follow the gauze strip, and means for stopping the operation of the mechanism in the event that the gauze strip follows the breaker roll.

6. In a machine for making sanitary napkins, the combination of a conveyor for supporting and propelling a strip of cushion material, means for supporting a supply roll of said cushion material comprising an arm pivotally mounted on one end and provided at its other end with cushion roll spindle receiving means, and means for yieldingly urging said arms to swing upwardly, said arms being arranged to support said supply roll in engagement with said conveyor and also to partially support the weight of said supply roll.

7. In a machine for making sanitary napkins, the combination of a conveyor for supporting and propelling a cushion supply strip, means for propelling a gauze strip, means for guiding said gauze strip through a predetermined path of travel, means for guiding and delivering said cushion supply strip to said gauze strip in a predetermined position intermediate the width of the latter, means for separating from said cushion supply strip the delivered forward end portion thereof to form a relatively independent cushion strip, means for causing said cushion strip to travel with said gauze strip, other means for depositing an absorbent pad on said gauze strip in predetermined relation to said separated cushion strip portion, and means for folding said gauze strip around said pad and incidentally disposing said cushion strip over a predetermined surface portion of the pad.

8. In a machine for making sanitary napkins, the combination of a conveyor for supporting and propelling a cushion supply strip, means for propelling a gauze strip, means for guiding said gauze strip through a predetermined path of travel, means for guiding and delivering said cushion supply strip to said gauze strip in a predetermined position intermediate the width of the latter, means for separating from said cushion supply strip a forward end portion thereof to form a relatively independent cushion strip, pneumatic means for causing said cushion strip to travel with said gauze strip, means for depositing an absorbent pad on said gauze strip in predetermined relation to said cushion strip, and means for folding said gauze strip around said pad and incidentally disposing said cushion strip over a predetermined surface portion of the pad.

9. In a machine for making sanitary napkins, the combination of means for propelling a continuous strip of gauze, means for propelling a thin and narrow strip of cushion material, means for guiding said cushion strip to predetermined position on the gauze strip intermediate the width of the latter, means for separating from the cushion strip a delivered forward end portion thereof of predetermined length, means for depositing an absorbent pad on said gauze and separated cushion strip portion with the pad overlying a longitudinal marginal side portion of the cushion strip, and means for simultaneously folding said gauze and cushion strip around said absorbent pad.

CHARLES A. FOURNESS.
CHARLES J. GREINER.